United States Patent [19]

Kawamura et al.

[11] Patent Number: 5,150,306
[45] Date of Patent: Sep. 22, 1992

[54] CUTTING TOOL STOP-CONTROL APPARATUS

[75] Inventors: Hideaki Kawamura; Takao Sasaki, both of Hachioji; Syuji Matsuura, Kodaira, all of Japan

[73] Assignee: Fanuc Ltd., Minamitsuru, Japan

[21] Appl. No.: 767,560

[22] Filed: Sep. 30, 1991

Related U.S. Application Data

[63] Continuation of Ser. No. 391,561, Jul. 21, 1989, abandoned.

[30] Foreign Application Priority Data

Dec. 3, 1987 [JP] Japan .................................. 62-306523
Nov. 18, 1988 [WO] PCT Int'l Appl. ... PCT/JP88/01171

[51] Int. Cl.$^5$ ....................... G06F 15/46; G05B 19/18
[52] U.S. Cl. ................. 364/474.34; 364/184; 364/474.02; 364/474.19
[58] Field of Search ....................... 364/474.34, 474.19, 364/474.15, 474.17, 474.28, 474.02, 184–187; 318/563, 565

[56] References Cited

U.S. PATENT DOCUMENTS

| | | | |
|---|---|---|---|
| 4,045,660 | 8/1977 | Weisgerber et al. | 364/474.34 |
| 4,442,493 | 4/1984 | Wakai et al. | 364/474.34 X |
| 4,484,287 | 11/1984 | Gams et al. | 364/474.19 |
| 4,513,380 | 4/1985 | Spooner | 364/474.34 X |
| 4,597,040 | 6/1986 | Buizer | 364/474.34 X |
| 4,604,560 | 8/1986 | Inagaki et al. | 364/474.34 X |
| 4,606,001 | 8/1986 | Rieben et al. | 364/474.25 |
| 4,782,275 | 11/1988 | Sakamoto et al. | 364/474.34 X |
| 4,864,508 | 9/1989 | Iwagaya | 364/474.19 |

FOREIGN PATENT DOCUMENTS 45-37709 11/1970 Japan.
59-19657 1/1984 Japan.

*Primary Examiner*—Joseph Ruggiero
*Attorney, Agent, or Firm*—Staas & Halsey

[57] ABSTRACT

A cutting tool stop-control apparatus according to the invention is for controlling the stopping of a cutting tool when executing a hole drilling operation by a machining center or milling machine, and particularly when executing a back-boring operation. When the tool is subjected to an emergency return, depending on the actual conditions which prevail when an operation is suspended, the tool is withdrawn to the cycle starting point along an optimum path in accordance with a continuance program, and the prescribed operation is resumed automatically after the tool is changed.

4 Claims, 3 Drawing Sheets

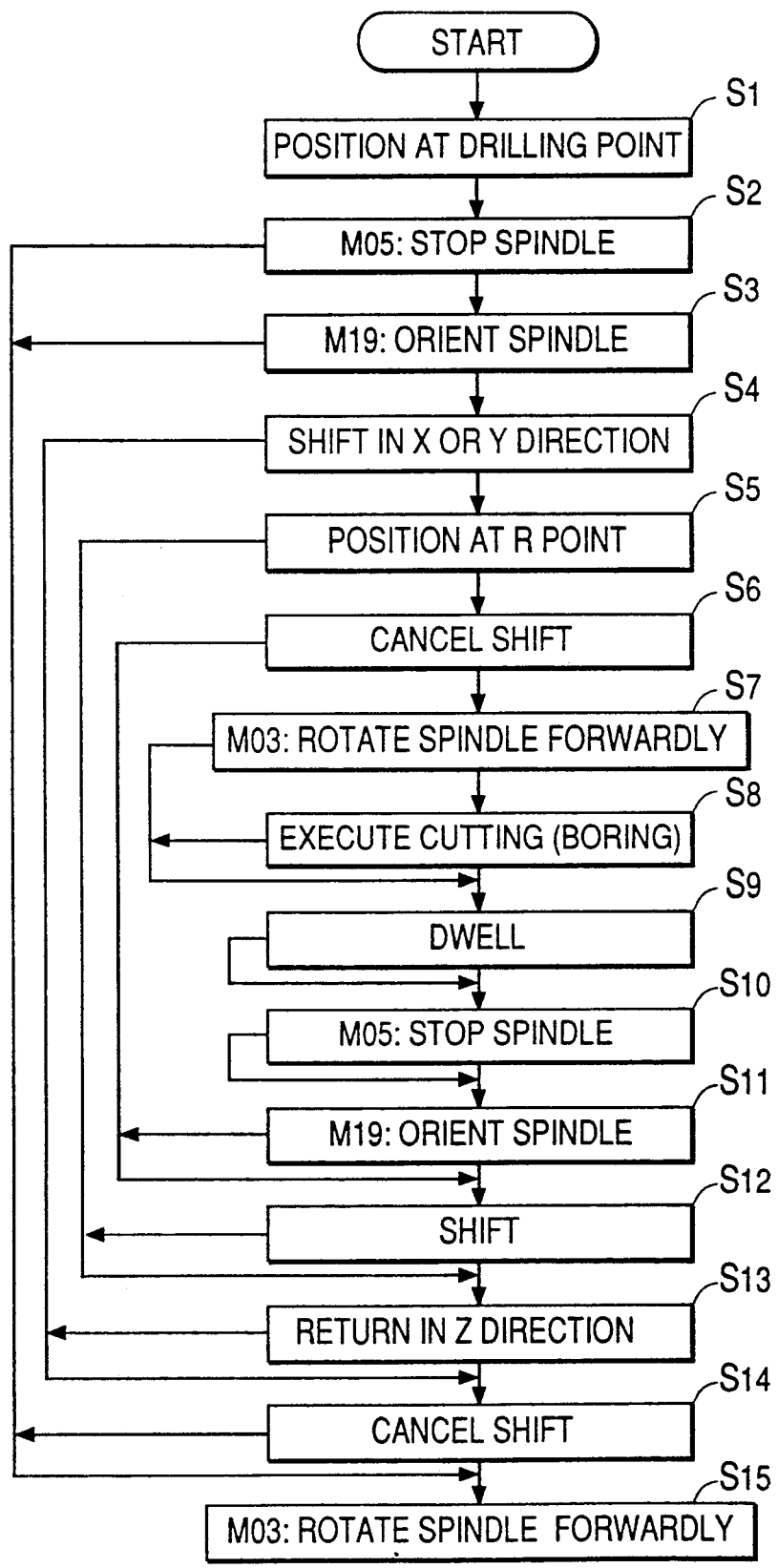

CUTTING TOOL STOP-CONTROL APPARATUS

This application is a continuation of application Ser. No. 391,561, filed Jul. 21, 1989, now abandoned.

BACKGROUND OF THE INVENTION

1. Field of the Invention

This invention relates to a cutting tool stop-control apparatus for controlling the stopping of a cutting tool when executing a hole drilling operation by a machining center or milling machine, and particularly when executing a back-boring operation.

2. Description of the Related Art

In order to machine a workpiece by an ordinary CNC machine tool, a program for controlling the movement of a tool in dependence upon the contents of machining is created and the machine tool is run in an NC mode based on the program. When an abnormal condition such as tool breakage occurs on the side of the machine tool, the numerical control apparatus is capable of interrupting cycle operation, which is based upon the cycle program in the process of being run. On the side of the machine tool, the cutting tool is brought to an emergency stop, after which the tool is changed. In order to resume the prescribed operation applied to the workpiece, it is required that the tool be withdrawn to the cycle starting point.

With a numerical control apparatus of this kind, generally a method is adopted in which the tool is returned to the cycle starting point while the path of withdrawal is read out as the reverse of the same path traversed. For example, if operation is suspended when a program is being executed in a machining mode having a complicated path, as in the case of a back-boring cycle, the operation for withdrawing the tool to the cycle starting point is a major undertaking. In the prior art, therefore, operation from this time onward is switched over to manual to make the tool change. This is disadvantageous in that the efficiency of operation declines.

SUMMARY OF THE INVENTION

The present invention has been devised in order to solve the foregoing problems and its object is to provide a cutting tool stop-control apparatus in which, even if a stop request is generated in a machining mode having a complicated path, as in the case of a back-boring cycle, a machine tool can be automatically commanded to perform a post-stop continuation operation corresponding to the operation being executed.

In accordance with the invention, there is provided a cutting tool stop-control apparatus for bringing a cutting tool to an emergency stop during cycle operation based on a commanded cycle program, and restoring the tool to a cycle starting position, the apparatus including memory means for storing continuance programs for returning the cutting tool to the cycle starting position in accordance with a stopping position at each stage of the cycle operation, discriminating means for discriminating cycle operation content upon the occurrence of a stop, and program control means for calling a continuance program, which is stored in the memory means, from the cycle program in accordance with a stopping position corresponding to the discriminated cycle operation.

Accordingly, the cutting tool stop-control apparatus of the invention is such that if tool breakage occurs during cycle operation, the operation is not merely suspended automatically. Rather, in accordance with the continuance program conforming to the actual conditions that prevail at the suspension of operation, the tool is withdrawn to the cycle starting point along the optimum path and operation following the tool change is resumed automatically.

According to the present invention, there can be provided a cutting tool stop-control apparatus for tool control having a complicated machining path, as in the case of a back-boring cycle, in which a tool change is possible upon controlling a spindle to move it to the cycle starting position in a reliable fashion. Accordingly, the apparatus is useful in that a machine tool employing a self-restoration system can have its automatic operation controlled in an efficient manner.

BRIEF DESCRIPTION OF THE DRAWINGS

FIG. 5 is a flowchart illustrating the contents of a continuance program.

DETAILED DESCRIPTION OF THE PREFFERED EMBODIMENTS

An embodiment of the present invention will now be described in detail with reference to the drawings.

Figure 1:
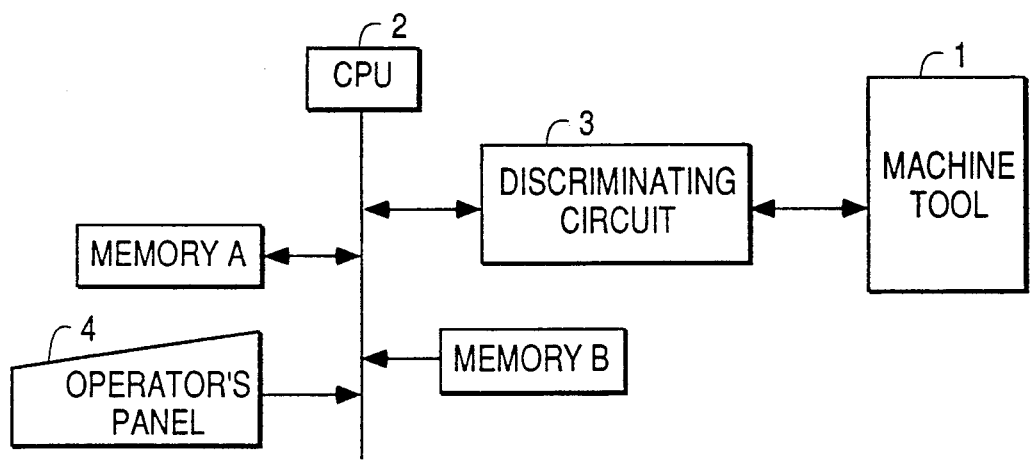
FIG. 1 is a block diagram illustrating an embodiment of the invention.

FIG. 1 is a block diagram illustrating an example of a numerical control apparatus for controlling the NC operation of a machine tool 1. A CPU 2 is equipped with a memory A storing a program for controlling the machine tool 1, and a memory B storing a continuance program for returning a tool to a cycle starting position in accordance with the tool stopping position at each stage of cycle operation. Connected to the CPU are a discriminating circuit 3 which discriminates the content of cycle operation when the operation of the machine tool 1 is suspended, and an operator's panel 4 for external control, such as the setting of modes.

Figure 2:
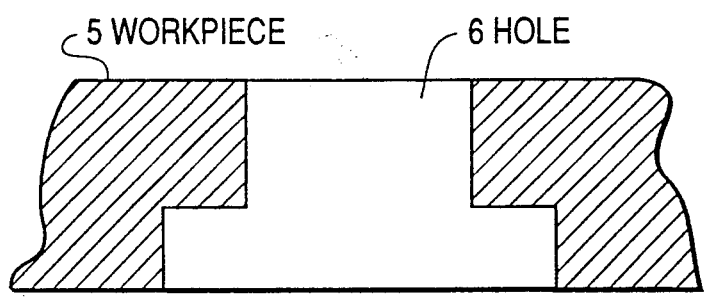
FIG. 2 is a sectional view illustrating an example of workpiece machining.

FIG. 2 is a sectional view illustrating an example of a workpiece 5 machined by the machine tool 1. The workpiece 5 has its interior cut away to a diameter greater than that of an initial hole 6 formed by a separate machining process. Back-boring machining entails inserting a tool into the workpiece from above the initial hole 6, shifting the rotational axis of the tool over the range of the diameter of the initial hole 6 and then applying cutting machining a prescribed distance thereabove. The back-boring cycle is set by steps serving as one series of operations, which will be described next.

Figure 3:
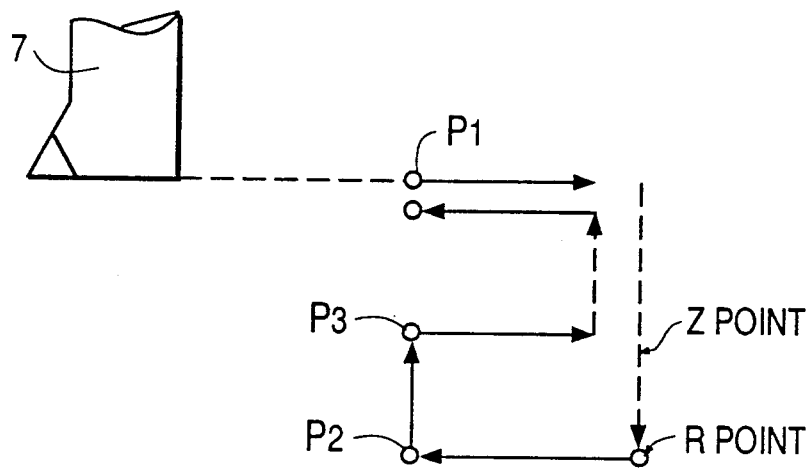
FIG. 3 is a view for describing the operation of back-boring cycle.

FIG. 3 is a view for describing the operation of the back-boring cycle. The following cycle is applied to a numerical control apparatus in a data format regarding machining in the following canned cycle:

G87X - Y - Z - R - Q - P - F - L - ;

In other words, in accordance with the foregoing a tool 7 is positioned at a drilling point $P_1$ designated by hole position data X, Y, after which the spindle is stopped at a fixed rotational position and then shifted, in a direction opposite that of the tool nose, in conformity with the hole 6 formed in the workpiece. Thereafter, the tool is positioned at the hole bottom (point R) in the rapid-traverse mode, at which position the tool is returned the abovementioned shift amount and the spindle is rotated in the forward direction from point $P_2$ to perform cutting. Machining in the positive direction along the Z axis arrives at position $P_3$ corresponding to point Z, dwell is then applied and the spindle is stopped at the fixed rotational position, after which the tool is again shifted in a direction opposite the tool nose. In this way the tool 7 is extracted in the Z direction from the initial hole position and shift is cancelled, thereby restoring the tool to the drilling position $P_1$, which is the initial cycle starting point. Processing then proceeds to the operation of the next block.

Figure 4:
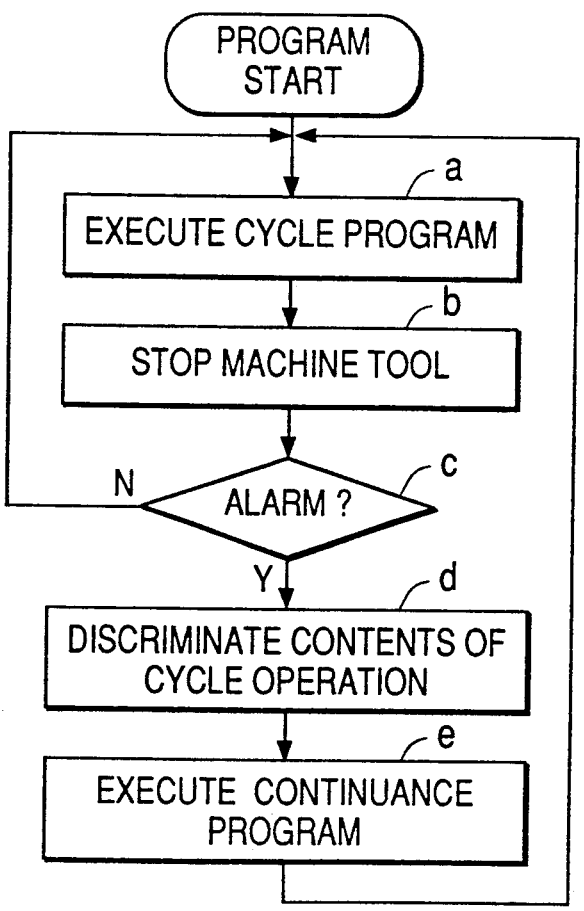
FIG. 4 is a view illustrating a machining control operation based on a back-boring cycle.

FIG. 4 is a view illustrating the machining control cycle based on the back-boring cycle. During execution of a cycle program (step a), the numerical control apparatus applies an emergency stop in response to an alarm from the machine tool side, thereby stopping the machine tool (step b). At this time, the cycle program being executed is suspended and, at the same time, the stopped state of the machine tool is discriminated. If the stopped state is due to generation of the alarm (step c), a predetermined continuance program is called in accordance with the program execution state at this time (step d). The tool 7 is then returned to the starting point of the back-boring cycle at an optimum operating sequence (step e).

FIG. 5 is a flowchart illustrating the contents of the continuance program in a case where a stop request is received during execution of each operation for every one of the operation steps $S_2$–$S_{14}$ of the abovementioned back-boring cycle.

In each case, if there is a stop request while the particular operation is being executed, the operation is halted and the continuation operation is executed in accordance with the arrows at the left sides of the blocks indicating the operation steps $S_2$–$S_{14}$, whereby the tool is returned to the cycle starting point. In other words, if axial movement is in effect, this movement is decelerated and stopped. If a dwell is being executed, this is suspended. If an M function is being executed, the program proceeds to the step designated after the operation specified by the M function ends. Thus, in a case where an emergency stop is applied, the prevailing operation is halted immediately and the tool can be returned to the starting point of the back-boring cycle by the continuance program through an optimum sequence conforming to the stopped state. Accordingly, all steps for subsequently executing tool change and performing the back-boring cycle again or for proceeding to a new machining cycle can be resumed automatically.

Though an embodiment of the present invention has been described, the invention it not limited thereto but can be modified in various ways without departing from the scope of the claims.

INDUSTRIAL APPLICABILITY

The cutting tool stop-control apparatus of the present invention is useful in that a machine tool employing a self-restoration system can have its automatic operation controlled in an efficient manner.

We claim:

1. A cutting tool stop-control apparatus for bringing a cutting tool to an emergency stop during cycle operation based on a commanded cycle program having plural sequential steps of operation, and restoring said tool to a cycle starting position, comprising:

memory means for storing a plurality of continuance programs, each one being specific to one of the plural sequential steps, for returning said cutting tool to the cycle starting position in accordance with a stopping position at each stage of the cycle operation and each comprising a return optimum sequence of steps;

discriminating means coupled to the memory means for discriminating cycle program operation step upon the occurrence of a stop; and program control means for calling one of the plurality of continuance programs, which is stored in said memory means, from said cycle program in accordance with a stopping position corresponding to the discriminated cycle operation step, thereby returning the cutting tool to the cycle starting point through the return optimum sequence of steps conforming to the stopping position.

2. A cutting tool stop-control apparatus according to claim 1, wherein said cycle program commands back-boring machining with regard to the cutting tool.

3. A cutting tool stop-control method for bringing a cutting tool to an emergency stop during cycle operation based on a commanded cycle program having plural sequential steps of operation, and restoring said tool to a cycle starting position, comprising:

storing a plurality of continuance programs, each one being specific to one of the plural sequential steps, for returning said cutting tool to the cycle starting position in accordance with a stopping position at each stage of the cycle operation and each comprising a return optimum sequence of steps;

discriminating cycle program operation step upon the occurrence of a stop; and calling one of the plurality of continuance programs, which is stored in memory means, from said cycle program in accordance with a stopping position corresponding to the discriminated cycle operation step, thereby returning the cutting tool to the cycle starting point through the return optimum sequence of steps conforming to the stopping position.

4. A cutting tool stop-control method according to claim 3, wherein said cycle program commands back-boring machining with regard to the cutting tool.

* * * * *

UNITED STATES PATENT AND TRADEMARK OFFICE
CERTIFICATE OF CORRECTION

PATENT NO. : 5,150,306

DATED : September 22, 1992

INVENTOR(S) : HIDEAKI KAWAMURA, TAKAO SASAKI and SYUJI MATSUURA

It is certified that error appears in the above-identified patent and that said Letters Patent is hereby corrected as shown below:

Column 2, line 54, after "by" insert --15--.

Signed and Sealed this

Twelfth Day of October, 1993

Attest:

BRUCE LEHMAN

Attesting Officer

Commissioner of Patents and Trademarks